United States Patent
Mirsky (10) Patent No.: US 11,477,100 B2
(45) Date of Patent: Oct. 18, 2022

(54) RESIDENCE TIME MEASUREMENT FOR TRAFFIC ENGINEERED NETWORK

(71) Applicant: ZTE Corporation, Shenzhen (CN)

(72) Inventor: Gregory Mirsky, Pleasanton, CA (US)

(73) Assignee: ZTE Corporation, Guangdong (CN)

( * ) Notice: Subject to any disclaimer, the term of this patent is extended or adjusted under 35 U.S.C. 154(b) by 14 days.

(21) Appl. No.: 15/716,110

(22) Filed: Sep. 26, 2017

(65) Prior Publication Data
US 2019/0097908 A1 Mar. 28, 2019

(51) Int. Cl.
| | |
|---|---|
| *H04L 43/0852* | (2022.01) |
| *H04L 43/106* | (2022.01) |
| *H04L 45/50* | (2022.01) |
| *H04L 45/00* | (2022.01) |
| *H04L 43/12* | (2022.01) |
| *H04L 43/50* | (2022.01) |

(52) U.S. Cl.
CPC ........ *H04L 43/0852* (2013.01); *H04L 43/106* (2013.01); *H04L 43/12* (2013.01); *H04L 43/50* (2013.01); *H04L 45/22* (2013.01); *H04L 45/26* (2013.01); *H04L 45/50* (2013.01)

(58) Field of Classification Search
CPC ... H04L 43/0852; H04L 43/12; H04L 43/106; H04L 45/22; H04L 45/50; H04L 45/26
See application file for complete search history.

(56) References Cited

U.S. PATENT DOCUMENTS

| | | | |
|---|---|---|---|
| 5,251,204 A | 10/1993 | Izawa et al. | |
| 7,778,171 B2 * | 8/2010 | Bedrosian | H04L 12/66 370/230 |
| 8,416,763 B1 * | 4/2013 | Montini | H04J 3/0667 370/350 |

(Continued)

FOREIGN PATENT DOCUMENTS

| | | |
|---|---|---|
| CN | 101499957 A | 8/2009 |
| CN | 102571480 A | 7/2012 |

(Continued)

OTHER PUBLICATIONS

Awduche, D., et al., "RSVP-TE: Extensions to RSVP for LSP Tunnels," The Internet Society, Network Working Group, RFC 3209, pp. 1-61, Dec. 2001.

(Continued)

*Primary Examiner* — Un C Cho
*Assistant Examiner* — Yu-Wen Chang
(74) *Attorney, Agent, or Firm* — Perkins Coie LLP (57) ABSTRACT

Residence time is a variable part of the propagation delay of the packet. Information about the propagation delay for each transient node can be used as performance metric to calculate the Traffic Engineered route that can conform to delay and delay variation requirements. In an exemplary embodiment, a computing device uses special test packets to measure residence time. The computing device calculates routes to direct special test packets to one or more nodes. A node may calculate the residence time metric, such as a residence time variation (RTV), or residence time (RT) per (Continued)

ordered set of ingress and egress interfaces of the node. The computing device may also collect the residence time metric per test set from each node and may use this information to calculate the Test Engineered route.

18 Claims, 8 Drawing Sheets

(56) References Cited

U.S. PATENT DOCUMENTS

| | | | |
|---|---|---|---|
| 2004/0218535 A1* | 11/2004 | Liong | H04L 41/0893 370/238 |
| 2005/0149531 A1* | 7/2005 | Srivastava | H04L 29/12066 |
| 2006/0171346 A1* | 8/2006 | Kolavennu | H04L 45/028 370/328 |
| 2010/0214913 A1 | 8/2010 | Kompella | |
| 2012/0163191 A1 | 6/2012 | Tokimizu et al. | |
| 2013/0170390 A1 | 7/2013 | Umayabashi et al. | |
| 2013/0343204 A1 | 12/2013 | Geib et al. | |
| 2014/0043992 A1* | 2/2014 | Le Pallec | H04L 43/10 370/252 |
| 2014/0092922 A1* | 4/2014 | Le Pallec | H04J 3/0685 370/503 |
| 2017/0302548 A1* | 10/2017 | Sarangapani | H04L 43/0864 |
| 2017/0324497 A1* | 11/2017 | Ruffini | H04L 45/50 |
| 2018/0077051 A1* | 3/2018 | Nainar | H04L 45/22 |
| 2018/0097725 A1* | 4/2018 | Wood | H04L 45/60 |
| 2019/0036804 A1* | 1/2019 | Mihelic | H04L 43/106 |
| 2019/0081720 A1* | 3/2019 | Barry | H04J 3/0667 |
| 2019/0356605 A1* | 11/2019 | Tanisho | H04L 45/54 |
| 2020/0084147 A1* | 3/2020 | Gandhi | H04L 41/0893 |
| 2021/0092037 A1* | 3/2021 | Rathi | H04L 43/10 |

FOREIGN PATENT DOCUMENTS

| | | |
|---|---|---|
| CN | 103155488 A | 6/2013 |
| CN | 103384986 A | 11/2013 |
| CN | 103563307 A | 2/2014 |
| CN | 103858391 A | 6/2014 |
| CN | 104980350 A | 10/2015 |
| CN | 106713141 A | 5/2017 |
| CN | 106877967 A | 6/2017 |
| EP | 2 381 622 A1 | 10/2011 |

OTHER PUBLICATIONS

Filsfils, C., et al., "Segment Routing Architecture draft-ietf-spring-segment-routing-12," Internet Engineering Task Force (IETF), Internet-Draft, pp. 1-28, Jun. 2017.

Fioccola, G., et al., "Alternate Marking method for passive and hybrid performance monitoring," Internet-Draft, Network Working Group, Internet Engineering Task Force (IETF), 31 pages, Jun. 2017.

Giacalone, S., et al., "OSPF Traffic Engineering (TE) Metric Extensions," Internet Engineering Task Force (IETF), RFC 7471, pp. 1-19, Mar. 2015.

Halpern, J., et al., "Service Function Chaining (SFC) Architecture," RFC 7665, Internet Engineering Task Force (IETF), 32 pages, Oct. 2015.

Hedman, P., "Description of Network Slicing Concept," NGMN 5G Project Requirements & Architecture—Work Stream E2E Architecture, Version 1.0, pp. 1-7, Jan. 2016.

Mirsky, G., et al., "Performance Measurement (PM) with Alternate Marking Method in Service Function Chaining (SFC) Domain," Internet-Draft, SFC Working Group, Internet Engineering Task Force (IETF), 7 pages, Jun. 2017.

Previdi, S., et al., "IS-IS Traffic Engineering (TE) Metric Extensions," Internet Engineering Task Force (IETF), RFC 7810, pp. 1-18, May 2016.

Quinn, P., et al., "Network Service Header," Internet-Draft, Service Function Chaining, Internet Engineering Task Force (IETF), 37 pages, Feb. 2017.

International Search Report and Written Opinion dated Jan. 8, 2019 for International Application No. PCT/CN2018/107766, filed on Sep. 26, 2018 (6 pages).

Chinese Office Action dated Jun. 28, 2021 for Chinese Patent Application No. 201880076445.4, filed on Sep. 26, 2018 (18 pages).

Chinese Office Action dated Jan. 19, 2022 for Chinese Patent Application No. 201880076445.4, filed on Sep. 26, 2018 (10 pages).

Indian First Examination Report dated Mar. 3, 2022 for Indian Patent Application No. 202047015596, filed on Sep. 26, 2018 (6 pages).

* cited by examiner

RESIDENCE TIME MEASUREMENT FOR TRAFFIC ENGINEERED NETWORK

TECHNICAL FIELD

The present disclosure relates to traffic engineering for communications network.

BACKGROUND

Development of the fifth generation mobile networks, or 5G, has led to the development of a concept known as network slice instance (NSI). NSI can be represented by a set of network functions, and resources to run the network functions, forming a complete instantiated logical network to meet certain network characteristics that may be required by the service instance(s). Both latency and jitter are among the network characteristics that can be specified when creating the NSI. For example, an upper limit on acceptable latency of jitter for an NSI may be specified at the creation time. However, there are no definition of a performance metric that can be used to evaluate end-to-end latency and jitter of a network path without actually instantiating the path in the network. Such an approach of instantiating the path may be called "try-and-try" because it is quite likely that the path may fail to satisfy one or both metrics. Thus, a benefit of the exemplary embodiments is that it can identify the performance metric and methodology to measure end-to-end latency and jitter proactively. Another benefit of the exemplary embodiments is that it allows for a network path to be computed for the specific requirements of the NSI.

SUMMARY

In an exemplary embodiment, a computing device uses special test packets to measure residence time (RT). The computing device calculates routes to direct special test packets to one or more nodes. A node may calculate the residence time metric, including residence time variation (RTV) per ordered set of ingress and egress interfaces of the node. The computing device may also collect the RT metric per test set from each node and may use this information to calculate the Traffic Engineered paths.

An exemplary embodiment discloses a method of packet communication. The exemplary method comprises receiving, by a plurality of nodes, one or more test packets configured to traverse the plurality of nodes according to a list, identifying, by each of the plurality of nodes, information indicative of a requested residence time measurement for the one or more test packets, reading, by each of the plurality of nodes, a first clock value as each test packet is passed thereto, reading, by each of the plurality of nodes, a second clock value as each test packet is passed therefrom, and calculating the residence time of each test packet as a function of the first clock value and the second clock value.

In some embodiments, the calculating of the residence time of each test packet further includes calculating by subtracting the first clock value from the second clock value.

In some embodiments, the calculating of the residence time is performed by the plurality of nodes.

In some embodiments, the method further comprises transmitting, to a computing device, a residence time metrics that includes the calculated residence time.

In some embodiments, the method further comprises calculating, for each node, a minimum, a maximum, and a mean of the calculated residence time, calculating, for each node, a residence time variation for the one or more test packets by subtracting the minimum from the calculated residence time for one of the test packets, and transmitting, to a computing device, the residence time metrics that includes the minimum, the maximum, the mean, and the residence time variation.

In some embodiments, the calculating of any one or more of the minimum, the maximum, the mean, and the residence time variation residence time is performed by each node.

In some embodiments, the list of the plurality of nodes to be traversed by the one or more test packets is received from a computing device.

In some embodiments, the list includes a plurality of node segment identifications (SIDs) in an order to be traversed by one or more test packets. In some embodiments, the list further comprises one or more adjacency segment identifications (Adj-SIDs). In some other embodiments, the list includes an Explicit Route Object (ERO) that includes internet protocol addresses of the plurality of nodes. In some embodiments, the list is a Multi-Protocol Label Switching (MPLS) label stack.

In some embodiments, the one or more test packets are encapsulated in a header, and includes the list.

In another exemplary embodiment, a packet communication apparatus is disclosed. The apparatus comprises at least one processor and a memory having instructions stored thereon, wherein the instructions upon execution by the at least one processor configures the packet communication apparatus to: receive one or more test packets configured to traverse the plurality of nodes according to a list, identify information indicative of a requested residence time measurement for the one or more test packets, read a first clock value as each test packet is passed thereto, read a second clock value as each test packet is passed therefrom, and calculate the residence time of each test packet as a function of the first clock value and the second clock value.

In some embodiments, the at least one processor configures the packet communication apparatus to calculate the residence time of each test packet by subtracting the first clock value from the second clock value.

In some embodiments, the at least one processor further configures the packet communication apparatus to: calculate, for a node, a minimum, a maximum, and a mean of the calculated residence time, calculate, for the node, a residence time variation for the one or more test packets by subtracting the minimum from the calculated residence time for one of the test packets, and transmit, to a computing device, a residence time metrics that includes the calculated residence time of each test packet, the minimum, the maximum, the mean, and the residence time variation.

In some embodiments, the list includes a plurality of node segment identifications (SIDs) in an order to be traversed by one or more test packets. In some embodiments, the list further comprises one or more adjacency segment identifications (Adj-SIDs). In some other embodiments, the list includes an Explicit Route Object (ERO) that includes internet protocol addresses of the plurality of nodes.

In yet another embodiment, a computer platform is configured to generate the list.

Another exemplary embodiment discloses a computer program product comprising a computer-readable medium having code stored thereon, the code, when executed by a processor, causing the processor to implement a method. The exemplary code comprises instruction for receiving one or more test packets configured to traverse the plurality of nodes according to a list, instruction for identifying information indicative of a requested residence time measurement for the one or more test packets, instruction for reading a first clock value as each test packet is passed thereto, instruction for reading a second clock value as each test packet is passed therefrom, and instruction for calculating the residence time of each test packet as a function of the first clock value and the second clock value.

In some embodiments, the instruction for calculating of the residence time of each test packet further includes instruction for calculating by subtracting the first clock value from the second clock value.

In some embodiments, the code further comprises instruction for calculating, for a node, a minimum, a maximum, and a mean of the calculated residence time, instruction for calculating, for the node, a residence time variation for the one or more test packets by subtracting the minimum from the calculated residence time for one of the test packets, and instruction for transmitting, to a computing device, a residence time metrics that includes the calculated residence time of each test packet, the minimum, the maximum, the mean, and the residence time variation.

In some embodiments, the list includes a plurality of node segment identifications (SIDs) in an order to be traversed by one or more test packets. In some embodiments, the list further comprises one or more adjacency segment identifications (Adj-SIDs). In some other embodiments, the list includes an Explicit Route Object (ERO) that includes internet protocol addresses of the plurality of nodes.

DETAILED DESCRIPTION

Traffic Engineering (TE) relates to performance evaluation and optimization of communications networks. Thus, TE can be used to build network that satisfies one or more constraints. A network path or an explicit route may be calculated by a distributed control plane or by a centralized controller. Information about the path for the particular flow of data may be signaled by the control plane using, for example, source routing or Resource ReserVation Protocol for Traffic Engineering (RSVP-TE).

Source routing allows a sender of a packet to specify the route a packet takes through a network in the packet itself. Using the source routing approach, information about the path can be added at the ingress of the transport domain to each packet. Source routing is different from RSVP-TE where a path is signaled before data is sent over the path. RSVP-TE is a protocol that can be used by a host to signal explicit path and request specific qualities of services from a network for particular application data stream or flows. Thus, for example, RSVP-TE can be used by routers to deliver quality-of-service (QoS) requests to all nodes along the path(s) of the flows and to establish and maintain state to provide the requested service.

Internal Gateway Protocols (IGP) such as Open Shortest Path First (OSPF) and Intermediate System-Intermediate System (IS-IS) have been extended to advertise node and link TE information. However, both OSPF and IS-IS require that any measurement of link propagation delay should not include queuing delays. As result, there is no performance metric that reflects delay and delay variation for ordered pair of ingress and egress interfaces of the transient node to be used in computing route for a network slice instance that has delay and delay variation requirements.

Segment Routing

Figure 1:
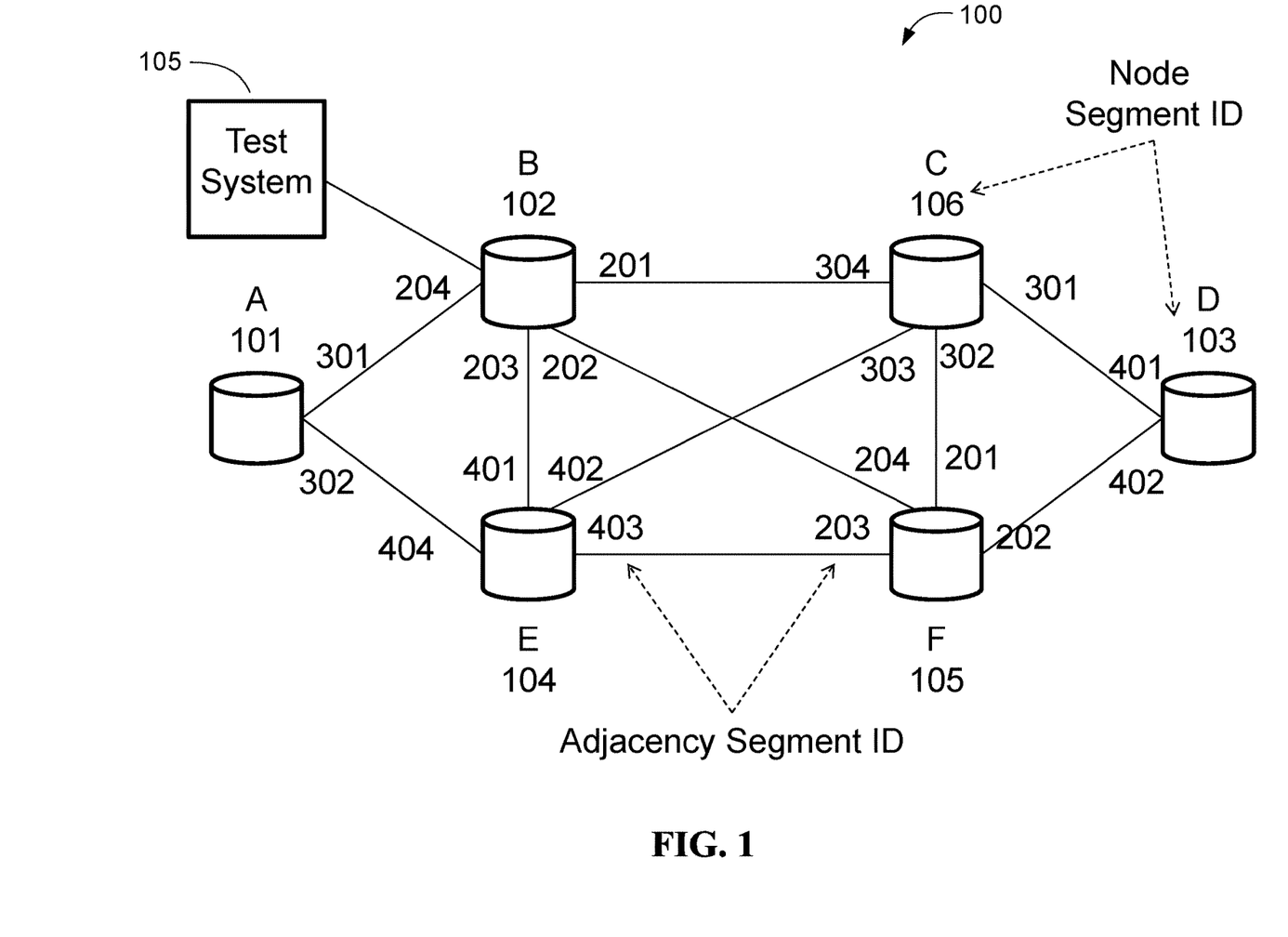
FIG. 1 shows an exemplary network domain identified by using segment routing architecture and Multi-Protocol Label Switching (MPLS) in the data plane.

FIG. 1 shows an exemplary network domain 100 identified by using segment routing architecture and Multi-Protocol Label Switching (MPLS) in the data plane. The network domain 100 of FIG. 1 includes as an example six nodes—Node A 101, Node B 102, Node C 106, Node D 103, Node E 104, and Node F 105. A node can be a router or a computer host system or any other communication equipment in the network domain 100. For example, a node can host various network services associated with a network slice instance. As shown in FIG. 1, each node in the network is assigned a Node Segment Identification (SID) that is unique within the network domain. Thus, for example, the SID for Node A is 101, the SID for Node B is 102, the SID for Node C is 106, and so on.

FIG. 1 also shows that each interface of each node can also be assigned an Adjacency SIDs (Adj-SIDs) that are unique on the node itself. Each node enumerates its adjacency to its neighbor by assigning local ID, Adj-SID. In the label stack, an Adj-SID is preceded by the Node ID which provides the context for the Adjacency SID that immediately follows. While Adj-SIDs are different from the SIDs throughout the domain, the same value of Adj-SIDs may be used by several nodes in the same domain. For example, the Adj-SID for the egress from Node A to Node B is 301, the Adj-SID for the egress from Node B to Node A is 204, the Adj-SID for the egress from Node C to Node D is 301, and the Adj-SID for the egress from Node D to Node C is 401, and so on. In some embodiments where Adj-SIDs are used, an Adj-SID is preceded by the corresponding Node SID because Adj-SIDs are unique on the node itself.

In FIG. 1, the different nodes may have a connection to a different communications network or the nodes themselves may be virtual entities in a data center that process and may realize various functions, such as functions for the network slice instances. Network slicing allows 5G networks to be sliced into vertical networks. Each network slice can be optimized to serve a vertical application to efficiently support network services. Virtualization can enable use of physical and virtual resources to create services. A virtual network function (VNF) can provide the tools to enable network slicing. A VNF can handle specific network functions that run on one or more virtual machines (VMs) on top of the hardware networking infrastructure, such as routers, and switches. VMs are usually ran on common servers. Servers can be connected with switch fabric. Routers and switches usually realize Physical Network Functions (PNFs) that may be combined with VNFs to support particular service. A VNF can be designed to consolidate and deliver the networking components to support a fully virtualized infrastructure including virtual servers, storage, and even other networks. Individual virtual network functions can be connected or combined together as building blocks to offer a full-scale networking communication service.

Figure 2:
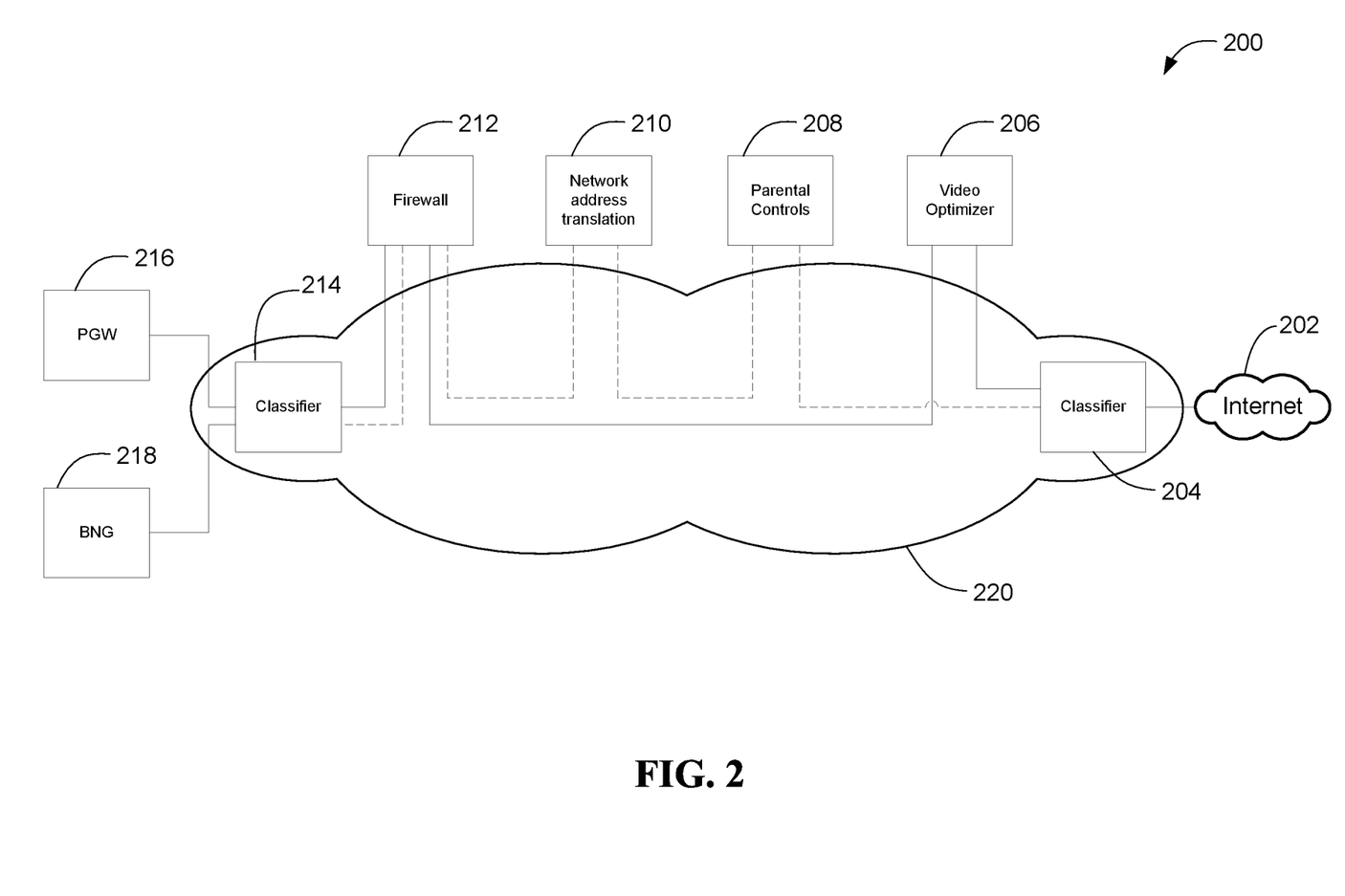
FIG. 2 shows two examples of service function chaining (SFC) in a virtual network function (VNF) environment.

FIG. 2 shows two examples of service function chaining (SFC) in a virtual network function (VNF) environment 200. A VNF can include service functioning chaining (SFC) that can be used by mobile carrier networks, such as 5G networks. In some embodiments, each of the two classifiers 204 and 214 may be placed in the same data center as the ingress service function forwarder (not shown) of the service function chain. In a first example, as shown by the solid lines in between the two classifiers 204 and 214, the data traffic received from the Internet 202 is steered through service functions such as video optimizer 206 and firewall 212. The steering of the data traffic may take place in a resource cloud 220, such as a data center or one or more cloud servers. The resource cloud 220 may be public or private or a hybrid of public and private. The data traffic may include Internet Protocol (IP) packets or frames.

In a second example, as shown by the dashed lines between the two classifiers 204 and 214, the data traffic received from the Internet 202 is steered through service functions such as parental controls 208, network address translation 210 and firewall 212. In some implementations, data steered through one or more service functions can be sent to a packet data network gateway 216 to send to mobile networks for mobile devices, such as a smartphone. In other implementations, data steered through one or more service functions can be sent to a broadband network gateway 218 to send to a fixed networks for fixed devices, such as a laptop, a desktop, or a server. In a VNF environment 200, software can be used to set up and tear down different service functions (SFs) as needed.

Returning to FIG. 1, the test system 105 can be used to calculate the residence time of the packets in the various nodes. In some embodiments, the test system 105 may be connected to at least one node, such as Node B 102 as shown in FIG. 1. In some other embodiments, the test system 105 can also be connected to the other nodes. In some embodiments, the connection between the test system 105 and the one or more nodes may be physical. In some other embodiments, the connection between the various nodes and the test system 105 may not be physical and instead may be referred to as management channel, such as an "in-band" management channel. The test system 105 uses the management channel to send messages into a routed network. The packet sent by the test system 105 is delivered to the appropriate destination because the packet is addressed and recognized as including management information. The features associated with the test system 105 are described in the disclosure related to FIG. 3.

Figure 3:
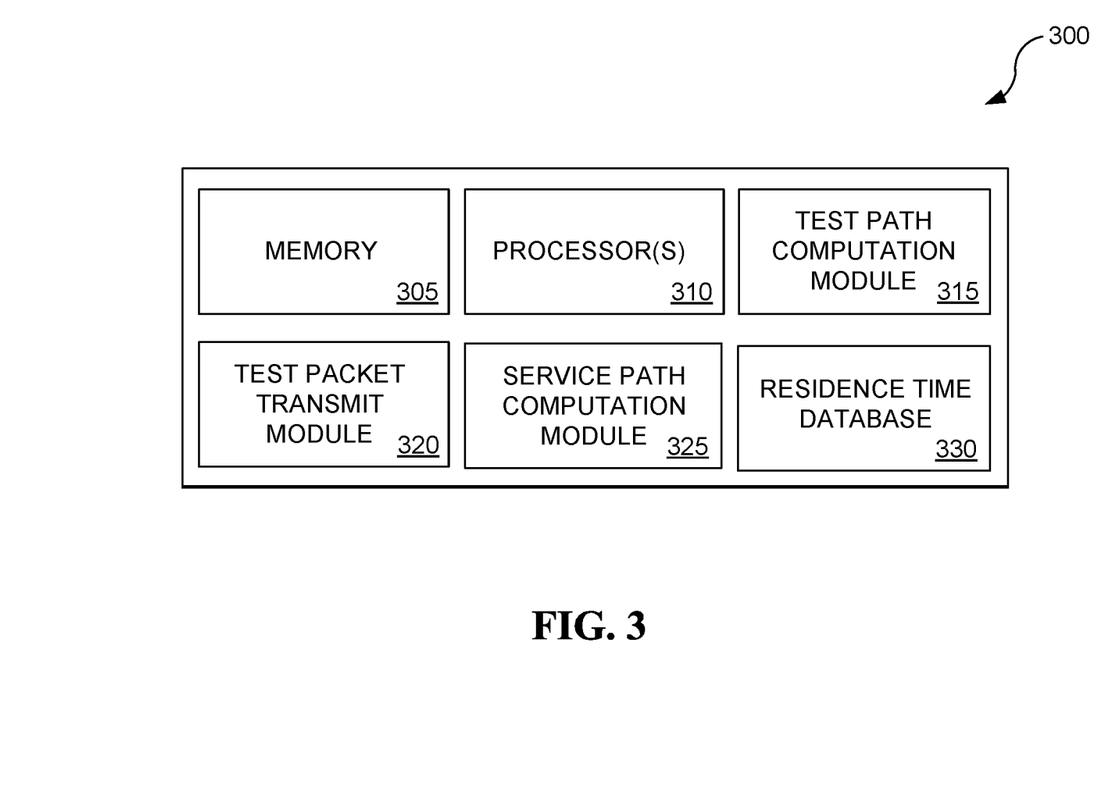
FIG. 3 shows a block diagram of an exemplary test system.

FIG. 3 shows a block diagram of an exemplary test system 300. The test system 300 may be a computing device, such as a server or a computer, and may include one or more processors 310 and a memory 305. The various modules and database of the test system 300 may be located on the same computing device or they may be located on different computing devices. The memory 305 may have instructions stored thereupon, wherein the instructions upon execution by the one or more processors 310, configure the test system 300 to perform several operations associated with the various modules and database.

A test path computation module 315 computes or determines the paths for test packets so that in some embodiments the combination of paths can provides coverage of the complete set of ordered pairs of ingress and egress interfaces for all nodes in the network. For example, in FIG. 1, node E has twelve ordered pairs of ingress and egress interfaces: {(403, 402), (403, 401), (403, 404), (402, 403), (402, 401), (402, 404), (401, 403), (401, 402), (401, 404), (404, 403), (404, 402), (404, 401)}. As another example, Node A has two ordered pairs of ingress and egress interfaces: {(301, 302), (302, 301)}. Taking as an example one of the ordered pairs, (403, 402), the first Adj-SID 403 may refer to the ingress interface and the second Adj-SID 402 may refer to the egress interface.

By using the test path computation module 315, the test system can be made aware of the network topology, such as identity of nodes and interconnecting links. That can be achieved, for example, by connecting the test system to Interior Gateway Protocol (IGP) domain, so that the test system receives the same routing information as nodes in the domain. Optimization of paths for test packets may be achieved incrementally by applying different constraints, e.g. paths should not cross the same pair of ingress-egress interfaces.

To reduce duplication in measuring residence time, transmission of test packets over subset of paths may be distributed among number of nodes in the domain. As a result of the computation of the test path, the test path computation module 315 constructs a list, such as a MPLS label stack, that includes node SIDs and optionally adjacency SIDs in the order to be traversed by the test packet. As an example, an MPLS label stack for determining residence time related metrics for Nodes A to B to F include labels listed from top to bottom of the label stack: 102; 105. There are three paths between Nodes B and F. Note that if label stack is 102, 105, then packet may take Adj-SID 202 as it is the shortest path. In order to test Node C in addition to testing Nodes A, B, and F, an example of an MPLS label stack may be 102, 106, 105 or 102, 201, 105. In some embodiments, a list contains Node SIDs. In some other embodiments, a list may contain both SIDs and Adj-SIDs. In such an embodiment, Adj-SID precedes the SID of the node that advertised it.

In some embodiment, an exemplary computer platform, such as a test system 300, can generate a list of nodes that can be traversed by one or more test packets. The computer platform can transmit one or more test packets configured to traverse the plurality of nodes according to a list. The computer platform can also generate information indicative of a requested residence time measurement for the one or more test packets. In some embodiments, the computer platform can calculate the residence time of each test packet as a function of the first clock value and the second clock value based on residence time metrics received from one or more nodes.

The test packet transmit module 320 prepares or creates a special test packet and encapsulates it, including the constructed list, such as the MPLS label stack produced by the test path computation module 315. The test packet may include test control message, MPLS label stack and the appropriate link layer, e.g. Ethernet, encapsulation. Ethernet header can be the outer header followed by the MPLS label stack that lists labels characterizing the source routed path calculated for the test packet. The test packet may use IP/UDP encapsulation and thus IP and UDP headers immediately follow the MPLS label stack. Test control message may be after the UDP header. The header may include the MPLS label stack that specifies the path for the test packet.

The test packet transmit module 320 transmits the encapsulated special test packet to the nodes identified in the constructed list. Upon reception of a packet a transient node identifies it as the special test packet for residence time measurement. Special test packets may be identified by using assigned UDP port number as destination UDP port number if IP or UDP encapsulation of the test control message are used. Alternatively, if Generic Associated Channel (G-ACh) encapsulation used so that there is no IP or UDP headers after the MPLS label stack, identification done by assigned G-ACh code point. In some embodiments, each node identifies information indicative of a requested residence time measurement for the special test packet. The node reads and stores clock values for the special test packet when the packet is being received and when the packet being transmitted. By subtracting the former value from the latter the node computes the residence time for the pair of ingress and egress interfaces on the node.

As an example, the test path computation module 315 may construct a list, such as a MPLS label stack so that a test packet may be sent from one node to another node. The MPLS label stack may contain Node SIDs and optionally Adjacency SIDs to explicitly specify the path for test control message. As discussed above, the same path may be specified in more than one way. In an example, a test packet may be sent from Node A to Node D of FIG. 1. In this example, the test packet sent from Node A 101 will be received by the ingress interface 204 of Node B 102. Node B 102 will transmit the packet to Node C 106 using the egress interface 201. Node B 102 will read and stores clock values for the test packet when Node B 102 receives the packet and when Node B 102 transmits the packet to Node C 106. The packet will be received by Node C 106 using the ingress interface 304 and sent to Node D 103 using the egress interface 301. Node C 106 will also read and stores clock values for the test packet when Node C 106 receives the packet and when Node C 106 transmits the packet to Node D 103. The test packet will be received by the ingress interface 401 of Node D 103. The test packet will terminate on Node D 103.

In some embodiments, a packet may traverse the same node multiple times. For example, the test path computation module 315 may construct a MPLS label stack so that a test packet may be sent from one node to another node, for example, from Node A to Node C to Node F to Node B and back to Node A of FIG. 1. In this example, the test packet will be sent from Node A 101 will be received by the ingress interface 204 of Node B 102. Node B 102 will transmit the packet to Node C 106 using the egress interface 201. Node B 102 will read and stores clock values for the test packet when Node B 102 receives the packet and when Node B 102 transmits the packet to Node C 106. The packet will be received by Node C 106 using the ingress interface 304 and sent to Node F 105 using the egress interface 302. Node C 106 will also read and stores clock values for the test packet when Node C 106 receives the packet and when Node C 106 transmits the packet to Node F 105. The test packet will be received by the ingress interface 201 of Node F 105 and sent to Node B 102 using egress interface 204. Node F 105 will also read and stores clock values for the test packet when Node F 105 receives the packet and when Node F 105 transmits the packet to Node B 102. Node B will send the test packet to Node A using the egress interface 204. Node B 102 will again read and stores clock values for the test packet when Node B 102 receives the packet and when Node B 102 transmits the packet to Node A 101. The test packet will terminate on Node A 101.

In some embodiments, for each node, the number of the consecutive measurements of the residence time can be combined in an associated test set to calculate minimum, maximum, mean values of the residence time (RT). RT is the delay introduced by the node. Residence time variation (RTV) or delay variation for the i-th packet in the test set can also be calculated for each node as difference between the minimum value of the residence time in the set and the residence time measured for the i-th packet:

$$RTV(i)=RT(i)-RT(\min)$$

Delay variation or RTV is the difference in time between two consecutive packets received at a node. Delay can be referred to as latency and delay variation can be referred to as jitter. Percentiles for RT and RTV also can be calculated for the test set. Regarding percentiles for RTV, consider an example of a test set that produced 100 RTV measurements. If the set of RTV values are ordered, then the 95th value is the 95 percentile and 99th value is the 99 percentile. To determine 99.9 percentile the set should be larger, e.g. 1000. Then 999th RTV value is the 99.9 percentile. Percentiles for RT can be similarly calculated. RT metrics can include minimum value, maximum value, mean value, RT or delay, RTV or delay variation, and percentiles for RTV. In an exemplary embodiment, the calculations for residence time can be performed in each node. In some other embodiments, these calculations can be performed in the test system 300 that can receive the test set from the various nodes to store in the residence time database 330. In the embodiments where each node performs the calculations for residence time, each node in the domain can periodically reports or transmit the RT metric of the test set to the test system 300. The RT metrics for each node can be stored in the residence time database 330.

Figure 4:
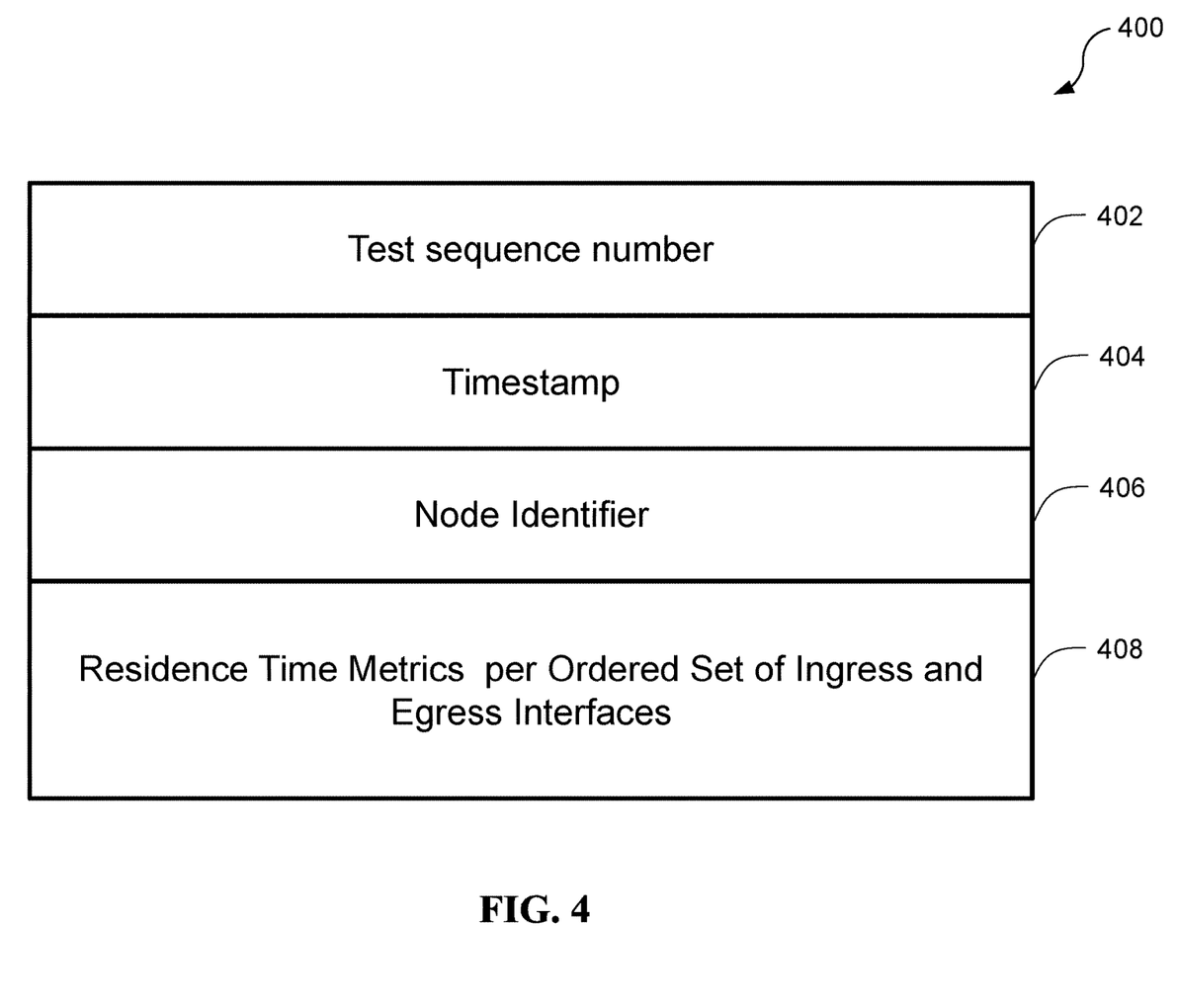
FIG. 4 shows an exemplary residence time report message format used by each node to report the residence time metric.

FIG. 4 shows an exemplary residence time report message format 400 used by each node to report the RT metric. The residence time report message format 400 includes a test sequence number 402 and timestamp 404. The test sequence number 402 can be used to identify the test packets. The timestamp 404 is the timestamp associated with transmitting the RT report.

The residence time report message format 400 includes a node identifier 406. For a segment routing network that uses MPLS data plane, a node SID can be used as the node Identifier 406. The residence time report message format 400 also includes RT metrics per ordered set of ingress and egress interfaces 408 and is further described in FIG. 5.

Figure 5:
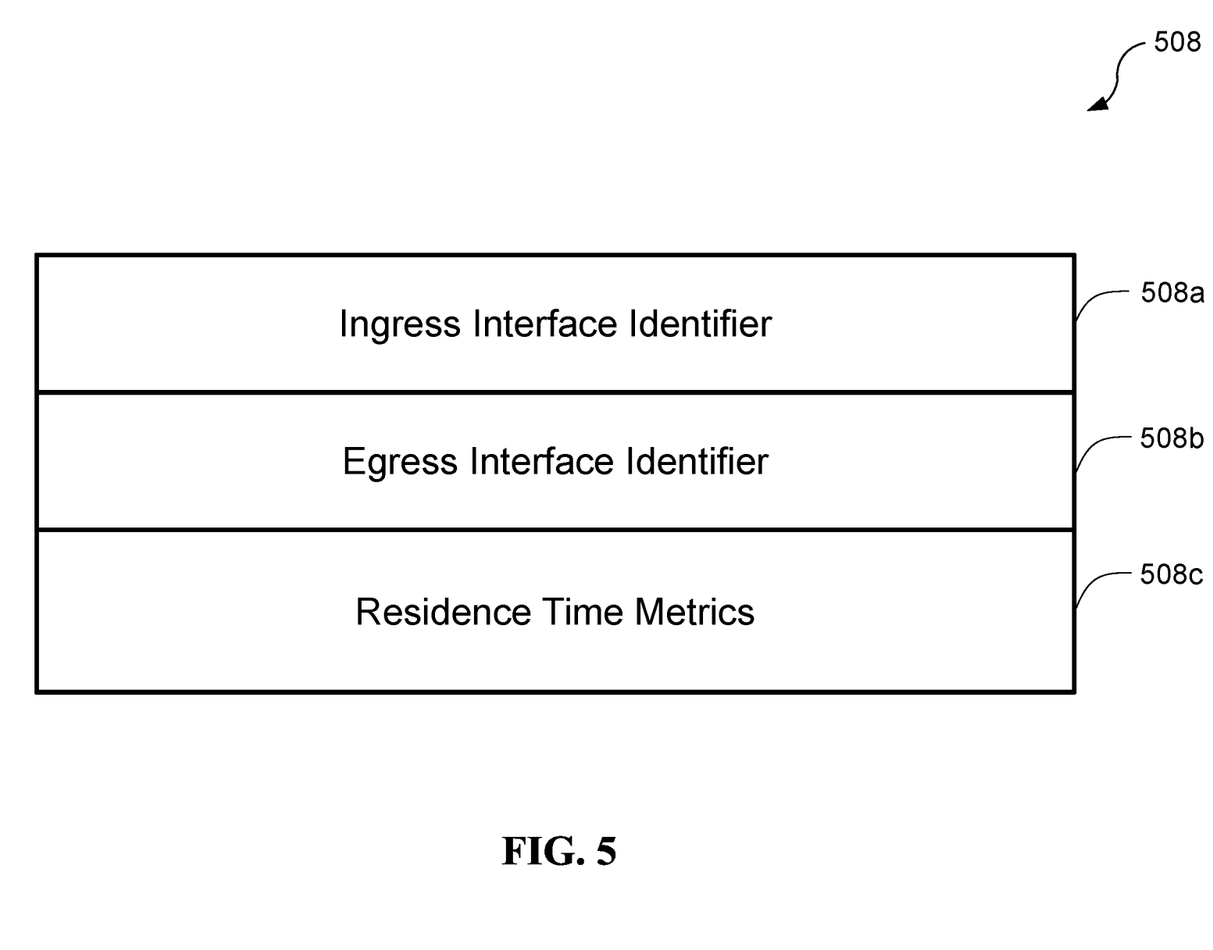
FIG. 5 shows an exemplary residence time metric message format.

FIG. 5 shows an exemplary residence time metric message format 508. As shown in FIG. 5, the adjacency SID can be used for an ingress interface identifier 508a and egress interface identifier 508b. The RT metrics 508c is provided per ordered set of ingress and egress interfaces 508.

Returning to FIG. 3, the test system 300 collects RT metrics reported in the residence time database 330. In some embodiments, the service path computation module 325 of the test system can also use the RT database to calculate delay and delay variation as part of TE path computation, for example, for network slice instances. A service path computation module 523 can determine the best path or set of paths to go from one node to another node using certain constraints such as delay and delay variation. In some embodiments, the best path or set of paths may have the lowest delay and delay variation.

Resource Reservation Protocol—Traffic Engineering (RSVP-TE)

Figure 6:
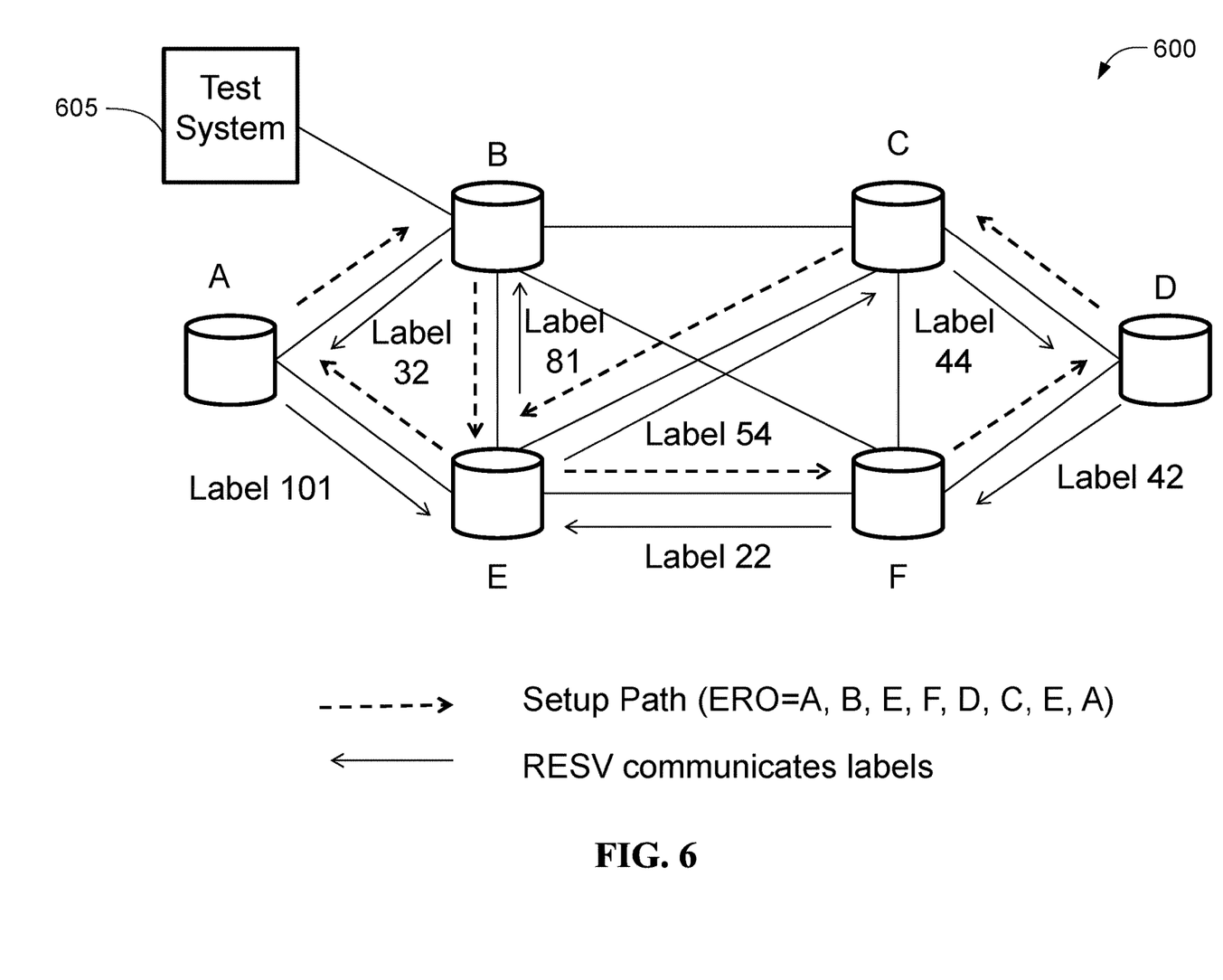
FIG. 6 shows an exemplary network domain identified by using Resource ReserVation Protocol for Traffic Engineering (RSVP-TE) and Multi-Protocol Label Switching Traffic Engineering (MPLS-TE) Label Switched Path (LSP).

FIG. 6 shows an exemplary network domain 600 identified by using RSVP-TE architecture and MPLS-TE. In this embodiment, a test system 605 includes a test path computation module that sets an explicit path for MPLS-TE Label switched Path (LSP) using RSVP-TE protocol. For instance, as described in this patent document, the test path computation module generates a list that identifies all the nodes that the test packet will traverse. In some embodiments, the list includes an Explicit Route Object (ERO) in RSVP-TE PATH message. An Explicit Route Object includes a list of IPv4 or IPv6 addresses as strict nodes. IPv4/IPv6 addresses may be addresses associated with nodes. As an example, the ERO setup path shown in FIG. 6 as dashed arrows lists nodes A, B, E, F, D, C, E, A. Node A, as the egress node of the LSP allocates local label 101 and sends RESV message that includes information representing label 101 to the node E. Next, Node E allocates its local label and sends the information about it in RESV message to Node C. This process continues and after each node performs label allocation and sends RESV message to the upstream node as listed in ERO, the process in this example ends with node A receiving from node B RESV message informing that the latter allocated label 32 for this RTM LSP. The solid arrow in FIG. 6 represents the RESV message that communicates the label information from one node to another.

In some embodiments, when a node, such as node A, informs the test system that the RTM LSP been set up successfully, the test system may instruct node A to start sending one or more test packets to perform residence time measurements. The process used by the test system and the nodes to measure and use residence time information is described in the sections above. For example, the test system may use the modules of FIG. 3 to perform operations described in this patent document. In some embodiments, the test packets traverse the identified nodes without bandwidth reservation for the Residence Time Measurement LSP.

Figure 7:
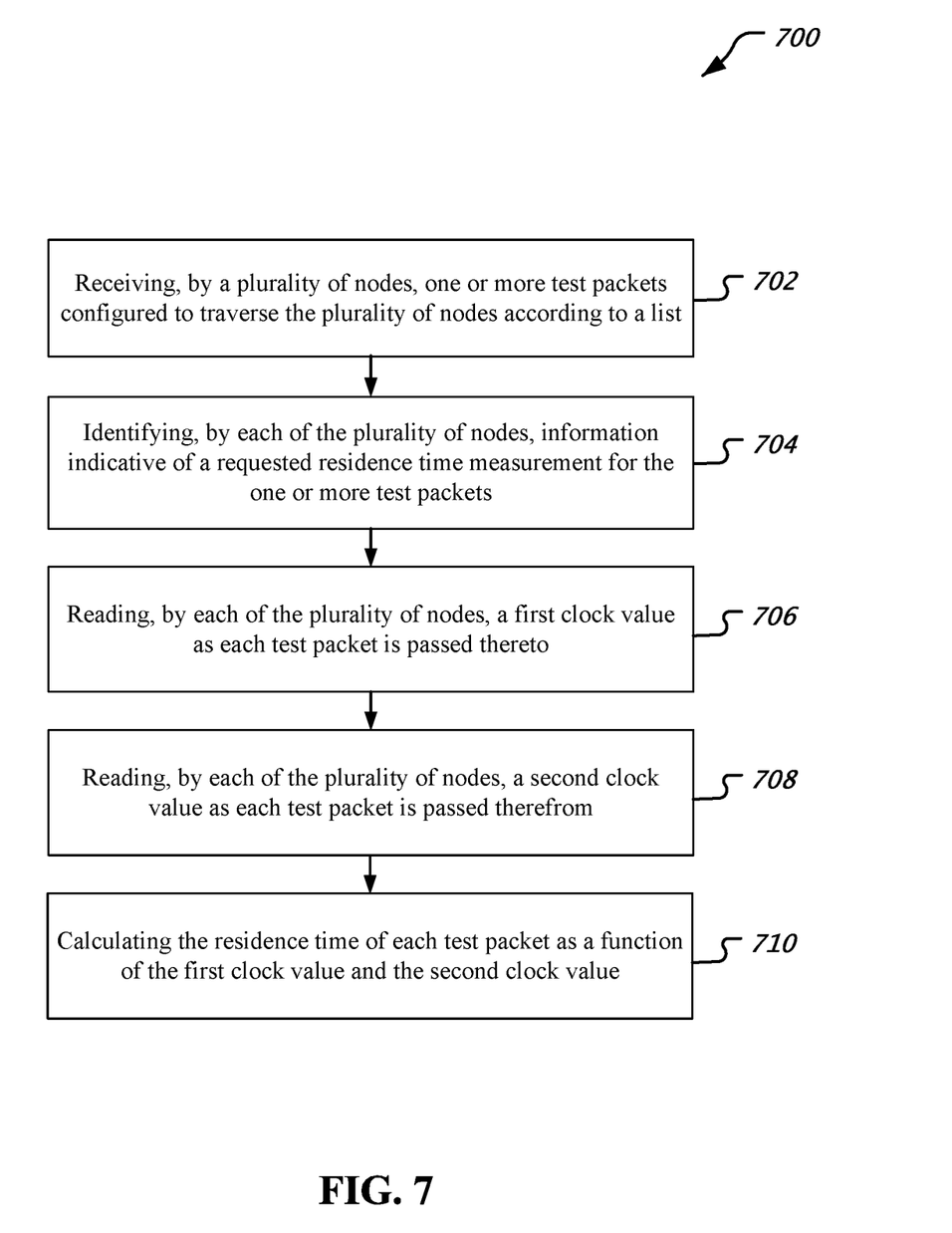
FIG. 7 shows an exemplary flowchart for performing residence time measurements.

FIG. 7 shows an exemplary flowchart for performing residence time measurements. At the receiving operation 702, the plurality of nodes receive one or more test packets configured to traverse the plurality of nodes according to a list. While the test packets may be configured to traverse the plurality of nodes according to a list, the measurements may be performed amid such traversal. For example, a packet may have traversed only some (one or more) of the nodes from the list prior to the receiving operation 702. In another example, a test packet may be traversing a second node while operations 704 to 708 are being performed on a first node traversed by a test packet.

At the identifying operation 704, each of the plurality of nodes identifies information indicative of a requested residence time measurement for the one or more test packets. At the first reading operation 706, each of the plurality of nodes reads a first clock value as each test packet is passed thereto. At the second reading operation 708, each of the plurality of nodes reads a second clock value as each test packet is passed therefrom. At the calculating operation 710, the residence time of each test packet is calculated as a function of the first clock value and the second clock value.

Figure 8:
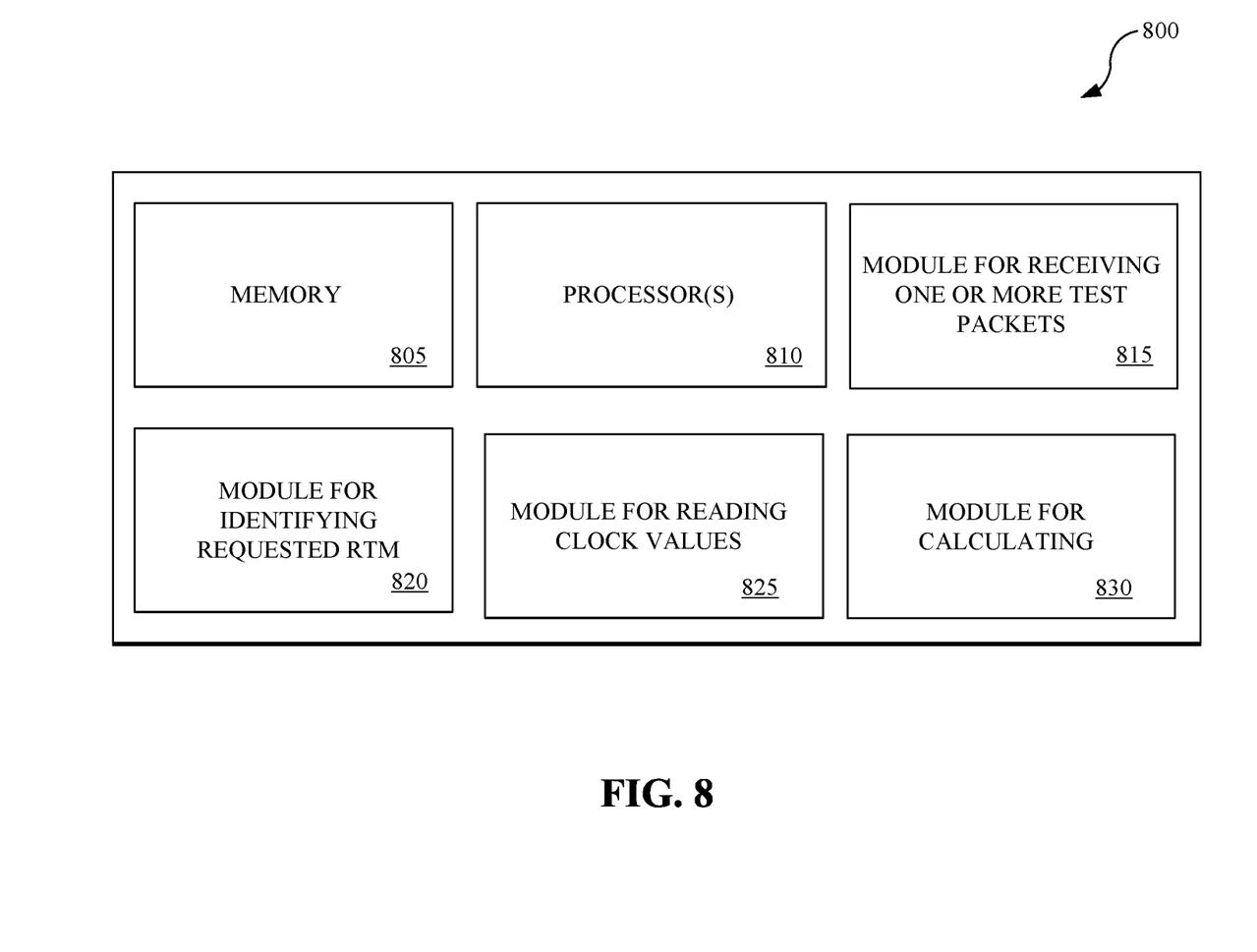
FIG. 8 shows a block diagram for an exemplary packet communication apparatus.

FIG. 8 shows a block diagram for an exemplary packet communication apparatus. The packet communication apparatus (800) includes at least one processor (810) and a memory (805) having instructions stored thereupon, wherein the instructions upon execution by the at least one processor, configure the apparatus to perform several operations. The module for receiving one or more test packets (815) receives one or more test packets configured to traverse the a node according to a list. The module for identifying requested residence time measurement (RTM) (820) identifies by the node information indicative of a requested residence time measurement for the one or more test packets. The module for reading clock values (825) reads by the node a first clock value as each test packet is passed thereto, and reads by the node a second clock value as each test packet is passed therefrom. The module for calculating (830) calculates the residence time of each test packet as a function of the first clock value and the second clock value.

The term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of packet communication, comprising:
receiving, by a plurality of nodes within a network domain, a test packet configured to traverse the plurality of nodes according to a list included in the test packet,
wherein the list comprises an ordered set of ingress interface identifiers and egress interface identifiers of the plurality of nodes,
wherein the ordered set indicates an order to be traversed by the test packet,
wherein the list comprises, for each node of the plurality of nodes, a first identifier that is immediately followed by a second identifier that is different from the first identifier,
wherein the first identifier uniquely identifies a node within the network domain and the second identifier identifies another node adjacent to the node, and
wherein, for a first node and a second node from the plurality of nodes, the list includes a same second identifier that identifies a third node and a fourth node that are respectively adjacent to the first node and the second node;
identifying, by each of the plurality of nodes, information indicative of a requested residence time measurement for the test packet;
reading, by each of the plurality of nodes, a first clock value as the test packet is passed thereto;
reading, by each of the plurality of nodes, a second clock value as the test packet is passed therefrom;
calculating, by each of the plurality of nodes, a residence time of the test packet as a function of the first clock value and the second clock value; and
transmitting, by each of the plurality of nodes to a computing device, a residence time report comprising a test sequence number that identifies the test packet, a timestamp when the residence time report is transmitted by a node, the first identifier of the node, the residence time of the test packet, and an ingress interface identifier and an egress interface identifier associated with the node.

2. The method of claim 1, wherein the calculating of the residence time of the test packet further includes calculating by subtracting the first clock value from the second clock value.

3. The method of claim 1, wherein the list of the plurality of nodes to be traversed by the test packet is received from the computing device.

4. The method of claim 1, wherein the list includes a plurality of node segment identifications (SIDs).

5. The method of claim 1, wherein the list further comprises one or more adjacency segment identifications (Adj-SIDs).

6. The method of claim 1, wherein the list includes an Explicit Route Object (ERO) that includes internet protocol addresses of the plurality of nodes.

7. The method of claim 1, wherein the list is a Multi-Protocol Label Switching (MPLS) label stack.

8. A packet communication apparatus comprising:
at least one processor and a memory having instructions stored thereon, wherein the instructions upon execution by the at least one processor configures the packet communication apparatus to:
receive a test packet configured to traverse a plurality of nodes according to a list included in the test packet,
wherein the list comprises an ordered set of ingress interface identifiers and egress interface identifiers of the plurality of nodes,
wherein the ordered set indicates an order to be traversed by the test packet,
wherein the list comprises, for each node of the plurality of nodes, a first identifier that is immediately followed by a second identifier that is different from the first identifier,
wherein the first identifier uniquely identifies a node within the network domain and the second identifier identifies another node adjacent to the node, and
wherein, for a first node and a second node from the plurality of nodes, the list includes a same second identifier that identifies a third node and a fourth node that are respectively adjacent to the first node and the second node;
identify information indicative of a requested residence time measurement for the test packet;
read a first clock value as the test packet is passed thereto;
read a second clock value as the test packet is passed therefrom;
calculate a residence time of the test packet as a function of the first clock value and the second clock value; and
transmit, to a computing device a residence time report comprising a test sequence number that identifies the test packet, a timestamp when the residence time report is transmitted by a node, the first identifier of the node, the residence time of the test packet, and an ingress interface identifier and an egress interface identifier associated with the node.

9. The packet communication apparatus of claim 8, wherein the at least one processor configures the packet communication apparatus to calculate the residence time of the test packet by subtracting the first clock value from the second clock value.

10. The packet communication apparatus of claim 8, wherein the list includes a plurality of node segment identifications (SIDs).

11. The packet communication apparatus of claim 8, wherein the list further comprises one or more adjacency segment identifications (Adj-SIDs).

12. The packet communication apparatus of claim 8, wherein the list includes an Explicit Route Object (ERO) that includes internet protocol addresses of the plurality of nodes.

13. A computer platform configured to generate the list in claim 8.

14. A non-transitory computer program product comprising a computer-readable medium having code stored thereon, the code, when executed by a processor, causing the processor to implement a method, the code comprising:
instruction for receiving a test packet configured to traverse the plurality of nodes according to a list included in the test packet,
wherein the list comprises an ordered set of ingress interface identifiers and egress interface identifiers of the plurality of nodes,
wherein the ordered set indicates an order to be traversed by the test packet, wherein the list comprises, for each node of the plurality of nodes, a first identifier that is immediately followed by a second identifier that is different from the first identifier, wherein the first identifier uniquely identifies a node within the network domain and the second identifier identifies another node adjacent to the node, and wherein, for a first node and a second node from the plurality of nodes, the list includes a same second identifier that identifies a third node and a fourth node that are respectively adjacent to the first node and the second node;

instruction for identifying information indicative of a requested residence time measurement for the test packet;

instruction for reading a first clock value as the test packet is passed thereto;

instruction for reading a second clock value as the test packet is passed therefrom;

instruction for calculating a residence time of the test packet as a function of the first clock value and the second clock value; and instruction for transmitting, to a computing device, a residence time report comprising a test sequence number that identifies the test packet, a timestamp when the residence time report is transmitted by a node, the first identifier of the node, the residence time of the test packet, and an ingress interface identifier and an egress interface identifier associated with the node.

15. The non-transitory computer program product of claim 14, wherein the instruction for calculating of the residence time of the test packet further includes instruction for calculating by subtracting the first clock value from the second clock value.

16. The non-transitory computer program product of claim 14, wherein the list includes a plurality of node segment identifications (SIDs).

17. The non-transitory computer program product of claim 14, wherein the list further comprises one or more adjacency segment identifications (Adj-SIDs).

18. The non-transitory computer program product of claim 14, wherein the list includes an Explicit Route Object (ERO) that includes internet protocol addresses of the plurality of nodes.

* * * * *